United States Patent
Giattino et al.

[11] Patent Number: 6,086,215
[45] Date of Patent: Jul. 11, 2000

[54] AQUARIUM AND ASSOCIATED LASER DEVICE AND METHOD OF USE THEREFOR

[75] Inventors: Delena Giattino, Dayton, Ohio; Bear Hsiung, Taipei, Taiwan

[73] Assignee: Miracle Beam, Inc., Pacoima, Calif.

[21] Appl. No.: 09/168,765

[22] Filed: Oct. 8, 1998

[51] Int. Cl.$^7$ ...................................................... F21V 33/00
[52] U.S. Cl. ......................... 362/101; 362/259; 362/806; 119/266; 119/267
[58] Field of Search ..................................... 362/259, 101, 362/806, 808, 253; 119/266, 267

[56] References Cited

U.S. PATENT DOCUMENTS

| | | |
|---|---|---|
| 3,563,204 | 2/1971 | Belmotronics . |
| 3,749,901 | 7/1973 | Poly-Optics . |
| 3,908,598 | 9/1975 | Jewson . |
| 4,081,666 | 3/1978 | Roehrick . |
| 5,067,059 | 11/1991 | Hwang . |
| 5,165,778 | 11/1992 | Matthiais . |
| 5,211,469 | 5/1993 | Matthias . |
| 5,343,652 | 9/1994 | Johnson ................................. 43/132.1 |
| 5,413,070 | 5/1995 | DeWalt . |
| 5,553,735 | 9/1996 | Kimura ................................... 220/469 |
| 5,597,228 | 1/1997 | Boyle . |

*Primary Examiner*—Thomas M. Sember
*Attorney, Agent, or Firm*—R. William Graham

[57] ABSTRACT

An aquarium and laser device associated therewith includes a tank having a base and transparent continuous wall sealingly connected to the base and extending upward therefrom to form a container, and a laser device operably associated with the tank in a manner such that the laser device is powerable to cause a laser beam to traverse the tank. The laser device preferably includes an ornamental structure disposed on the base of the tank and has operably disposed therein a laser beam emitter connected to a power source. A method of using the same is also provided.

13 Claims, 2 Drawing Sheets

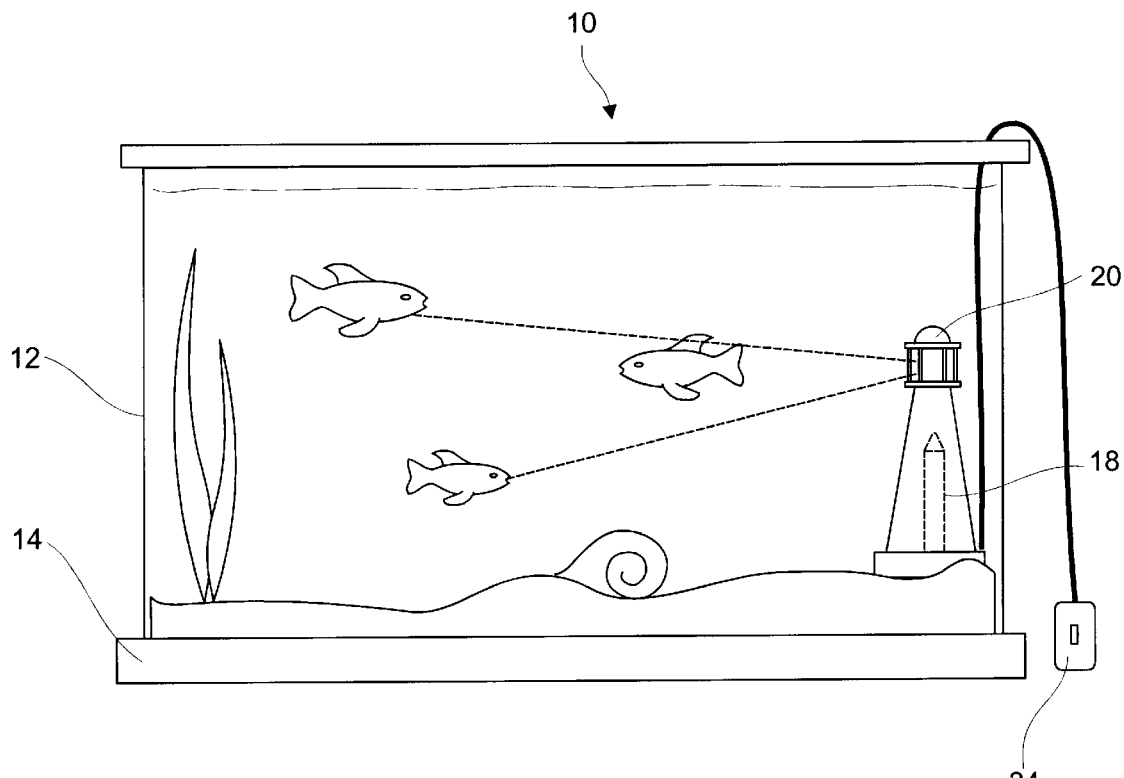
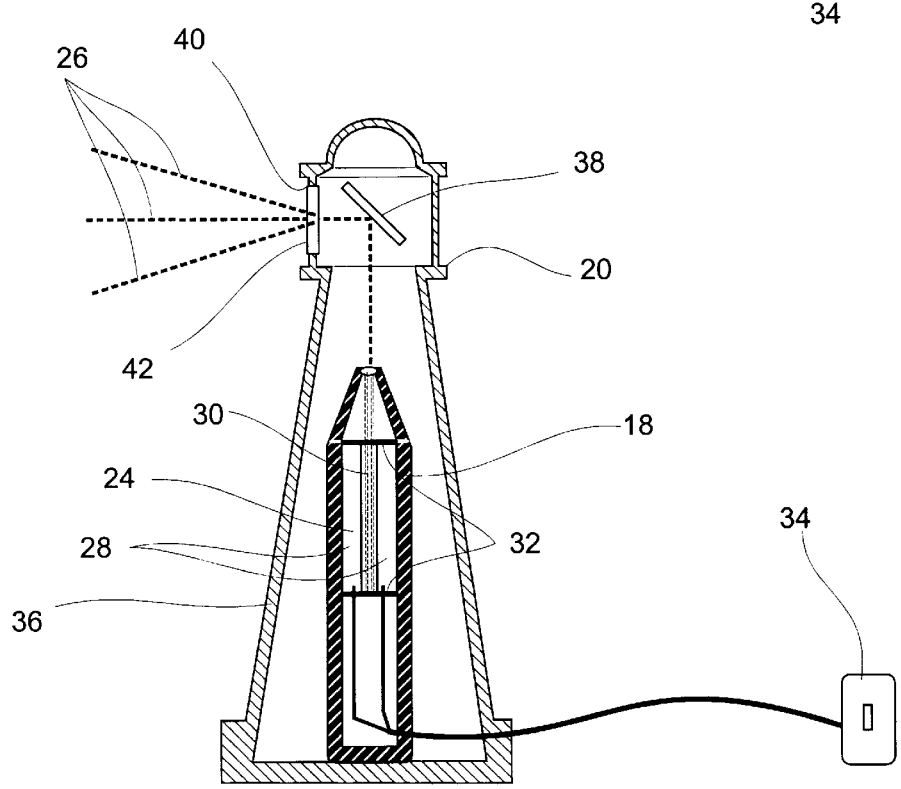

AQUARIUM AND ASSOCIATED LASER DEVICE AND METHOD OF USE THEREFOR

BACKGROUND OF THE INVENTION

1. Field of the Invention

The present invention relates to aquariums. More particularly, but not by way of limitation, the present invention relates to improvements in aquariums and lighting apparatus associated therewith.

2. Related Art

Aquariums are water-filled tanks, usually with glass sides, in which aquatic plants and animals, particularly fish, are kept. The term "aquarium" is commonly applied to single tanks for home use in which fish are kept for their decorative effect and interesting habits and to public institutions with tanks for exhibition and scientific study of aquatic life.

Home aquariums are often made to simulate a natural environment. Aquatic plants supply the oxygen needed by the fish, but often an aerating device is used to furnish additional oxygen. Popular tropical fish must have water at a constant temperature of 22° C. (72° F.) or more and seem to adapt better to man made environments which are more realistic and akin to their natural environment.

With this in mind, there is a desire to enhance the environment of aquariums. Particularly, it is desirable to enhance the viewability of fish and creatures within aquariums. Aquariums have employed a number of artificial devices to enhance the aesthetics of the fish and creatures as well as the tank itself. Various lighting fixtures have been used in tanks to enhance lighting of aquariums as well as a day light.

For example, aquarium tanks have used oblique angled transparent walls to refract light toward the viewing location. Other aquariums have used translucent bases with lights disposed thereunder to illuminate from the base upward. Still others have employed a fiber optic connected to the tank in a manner to add additional aesthetic appeal. Lights have also been employed in decorative structures. While these devices have aided viewability, they have failed to achieve any significant effect on the fish or creatures which live within the aquarium.

There continues to remain a need to enhance the aesthetics of aquariums. There is also a need to provide an interactive aquarium and overcomes deficiencies in the art.

BRIEF SUMMARY OF THE INVENTION

It is an object to improve aquariums.

It is another object to enhance the aesthetics of aquariums.

It is a further object to enhance interaction of fish within an aquarium.

It is yet another object to increase reproductive activity of fish in an aquarium.

It is another object to enhance skin color of fish.

It is still another object of the present invention to enhance aesthetics of ponds, such as man made ponds.

It is a further object to provide a night light for fish in an aquarium.

Accordingly, the present invention is directed to an aquarium having a laser device. The aquarium has a tank having a base and transparent continuous wall sealingly connected to the base and extending upward therefrom to form a container. A laser device is operably associated with the tank in a manner such that the laser device is powerable to cause a laser beam to traverse the tank. The laser device preferably includes an ornamental structure disposed on the base of the tank and has operably disposed therein a laser beam emitter connected to a power source.

A method of using a laser device in association with an aquarium to enhance viewability as well as other fish skin color and reproductive activity is also provided. The method includes the steps of disposing a suitable amount of water and fish within an aquarium tank, positioning a laser device with respect to the aquarium tank such that when the laser is powered, the laser emits a laser beam through the water and across the tank, and energizing the laser to cause emission of the laser beam. The method further includes positioning a diffractive device in a path of the laser beam.

Other objects and advantages will be readily apparent to those skilled in the art upon viewing the drawings and reading the detailed description hereafter.

BRIEF DESCRIPTION OF THE DRAWINGS

FIG. 2 is a perspective view of another embodiment of the present invention.

FIG. 3 is a cross-sectional view of a laser device of the present invention.

DETAILED DESCRIPTION OF THE INVENTION

Figure 1:
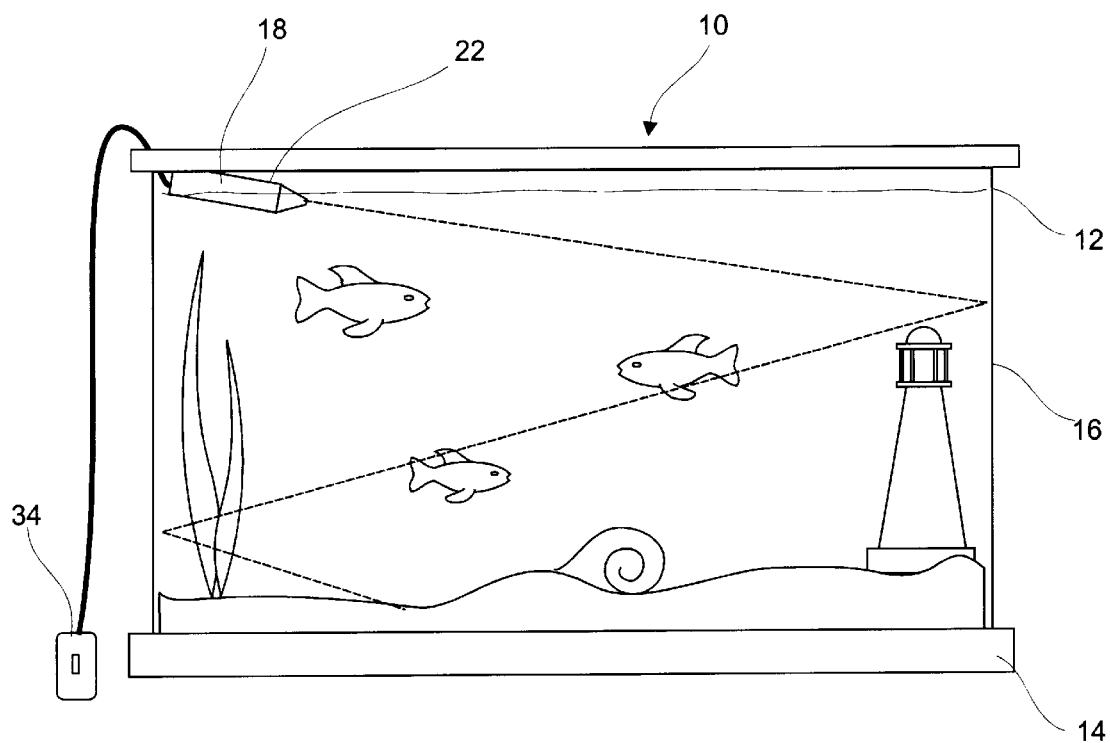
FIG. 1 is a perspective view of an embodiment of the present invention.

Referring now to the drawings, an aquarium of the present invention is generally referred to by the numeral 10. While an aquarium 10 is shown, it is contemplated that other contained bodies of water may be used to carry out the present invention, such as a man made pond. The aquarium 10 includes a tank 12 which includes a base 14 and plurality of transparent sides 16. The aquarium 10 also includes laser 18 which in one embodiment as seen in FIG. 1 is connected to the tank 12. In another embodiment as seen in FIG. 2, the laser device is operably disposed within an ornamental lighthouse 20.

As seen in FIG. 3, the laser 18 is constructed of a waterproof housing 22 in which is disposed a device 24 that amplifies light to produce coherent monochromatic light beams, ranging preferably from about 510 to 690 nanometers wavelength. The ranges set forth are by way of example and are not intended to be limiting in the present invention. The device 24 emits light in a coherent fashion, wherein atoms are excited to a certain state by an energy source at which they are then stimulated to emit the stored energy in the form of photons (a laser beam 26), a process known as stimulated emission.

By way of example in the present case, the laser 18 has a junction between layers of semiconductors 28 with different electrical conducting properties. A laser cavity 30 is confined to a junction region by means of two reflective boundaries 32. A suitable semiconductor environment, such as beryllium or gallium arsenide, is used to direct application of electrical current supplied from a power source 34 (preferably capable of delivering about 5 milliwatts) across the semiconductor junction to cause the stimulated emission.

The base 14 and transparent sides 16 are sealingly interconnected such that the sides 16 extend upward from the base 14 to form a container to hold water, fish and other underwater creatures, as well as various other landscape items and ornamental structures. In FIG. 3, there is depicted the lighthouse 20 which is also shown in FIG. 2. In the embodiment of FIG. 2, the lighthouse 20 has a housing 36 which contains the laser 18. The lighthouse 20 preferably has a reflective mirror 38 operably disposed therein to deflect the laser beam 26 out an open surface 40 of the lighthouse 20. The open surface 40 also includes a diffractive lens 42 disposed therein through which the laser beam 26 is diffracted or split into multiple beams. While a lighthouse 20 is depicted, it is contemplated that other ornamental housings may be employed about or in association with the laser 18 to achieve the objectives herein. For the embodiment of FIG. 1, the laser 18 can optionally have integrally formed in the housing 22 a similar aforementioned diffractive lens. The power device 34 shown is an ac transformer, but it is contemplated that a battery power source may be provided.

By providing the enhanced aquarium 10 of the present invention, there now exists a more interactive environment for the fish and creatures therein. It has been discovered by applicants that the incorporation of the laser 18, unlike prior lighting devices, actually attracts and stimulates fish, particularly tropical, to swim through the traversing laser beam 26. It is believed that the laser beam 26 simulates light rays which the fish are accustomed to experiencing in their natural environment.

Further, it is believed that the laser beam 26 enhances skin color of the fish, particularly tropical. Skin color tends to become more brilliant with exposure to the laser beam 26. It has also been observed that fish reproductive activity has substantially increased with the use and/or incorporation of the laser beam 18 in association with the aquarium 10. It is also believed that the present invention provides for a novel night light for the fish. The laser beam 26, unlike other aquarium lights does not cause the fish to wake up, rather they are able to sleep with the laser beam 26 propagating through the tank 12. Finally, the present invention provides novel entertainment to the viewer not heretofore known.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A aquarium and laser device associated therewith, includes:
   a tank having a base and transparent continuous wall sealingly connected to said base and extending upward therefrom to form a container having disposed therein a suitable amount of water, fish, and inanimate structure; and
   a laser device associated with said tank in a manner such that said laser device is powerable to cause a laser beam of coherent monochromic light to transverse the water in said tank.

2. The aquarium and laser device of claim 1, wherein said laser device is further characterized to include an ornamental structure disposed in said tank having operably disposed therein a laser beam emitter and a power source connected to said laser beam emitter.

3. The aquarium and laser device of claim 1, which further includes a diffractive device operably disposed in a path of said laser beam such that said laser beam is diffracted into a plurality of beams.

4. The aquarium and laser device of claim 2, wherein said ornamental structure includes a diffractive device operably disposed in a path of said laser beam such that said laser beam is diffracted into a plurality of beams.

5. The aquarium and laser device of claim 1 wherein said coherent monochromic light beam is of a wavelength within a range of about 510 to 690 nanometers.

6. A method of using a laser device in association with an aquarium which includes the steps of:
   disposing a suitable amount of water, fish, and inanimate structure within an aquarium tank;
   positioning a laser device with respect to said aquarium tank such that when said laser device is powered, said laser device emits a laser beam through said water and across said tank; and energizing said laser to emission of said laser beam.

7. The method of claim 6, which further includes positioning a diffractive device in a path of said laser beam.

8. The contained body of water and laser device of claim 7, wherein said laser device is further characterized to include an ornamental structure disposed in said container having operably disposed therein a laser beam emitter and a power source connected to said laser beam emitter.

9. The contained body of water and laser device of claim 7, which further includes a diffractive device operably disposed in a path of said laser beam such that said laser beam is diffracted into a plurality of beams.

10. The method of claim 6 wherein said coherent monochromic light beam is of a wavelength within a range of about 510 to 690 nanometers.

11. A contained body of water and laser device associated therewith, includes:
    a container having a base and a continuous wall substantially sealingly connected to said base and extending upward therefrom to form said container and having a suitable amount of water and fish contained therein; and
    a laser device associated with said container in a manner such that said laser device is powerable to cause a laser beam of coherent monochromatic light to traverse through said body of water in said container in a manner to contact said fish to provide a beneficial effect therefrom.

12. The contained body of water and laser device of claim 11, wherein said ornamental structure includes a diffractive device operably disposed in a path of said laser beam such that said laser beam is diffracted into a plurality of beams.

13. The contained body of water and laser device of claim 11 wherein said coherent monochromic light beam is of a wavelength within a range of about 510 to 690 nanometers.

* * * * *